:::

(12) United States Patent
Aguinaldo et al.

(10) Patent No.: US 11,519,489 B2
(45) Date of Patent: Dec. 6, 2022

(54) MOTOR GEAR SYSTEMS FOR CAMERAS

(71) Applicant: Panavision International, L.P., Woodland Hills, CA (US)

(72) Inventors: Daniel Aguinaldo, Santa Clarita, CA (US); Christopher Michael Konash, Mahwah, NJ (US)

(73) Assignee: Panavision International, L.P., Woodland Hills, CA (US)

( * ) Notice: Subject to any disclaimer, the term of this patent is extended or adjusted under 35 U.S.C. 154(b) by 0 days.

(21) Appl. No.: 16/941,482

(22) Filed: Jul. 28, 2020

(65) Prior Publication Data

US 2021/0033185 A1 Feb. 4, 2021

Related U.S. Application Data

(60) Provisional application No. 62/880,616, filed on Jul. 30, 2019.

(51) Int. Cl.
*F16H 55/10* (2006.01)
*F16H 55/12* (2006.01)
*F16H 1/20* (2006.01)
*G02B 7/04* (2021.01)

(52) U.S. Cl.
CPC .............. *F16H 55/12* (2013.01); *F16H 1/20* (2013.01); *G02B 7/04* (2013.01)

(58) Field of Classification Search
CPC .............. F16H 55/12; F16H 1/20; G02B 7/04
See application file for complete search history.

(56) References Cited

U.S. PATENT DOCUMENTS 5,381,272 A * 1/1995 Kato ................. G02B 7/04
    359/823
5,601,491 A * 2/1997 Chan ................. F16D 7/048
    192/56.1
7,980,324 B2 * 7/2011 Bixler ................ B25F 5/001
    173/176

(Continued)

OTHER PUBLICATIONS

International Search Report and Written Opinion dated Oct. 30, 2020 in corresponding International Application No. PCT/US202/044120 filed Jul. 29, 2020; total pp. 8.

(Continued)

*Primary Examiner* — Zakaria Elahmadi
(74) *Attorney, Agent, or Firm* — Snell & Wilmer L.L.P.

(57) ABSTRACT

Gear drive systems used with a camera comprise a housing with an electric drive gear disposed outside of the housing. A host gear is engaged with the drive gear and is rotatably disposed on a stationary shaft extending from the housing. An adapter is attached to the host gear and extends axially outwardly therefrom. A secondary gear is attached to the adapter and comprises a plurality of teeth disposed along an outside diameter. The secondary gear is releasably attached to the adapter by retaining elements and is fixed rotatably to the adapter by registration elements. The secondary gear is attached to the adapter by a push on snap-fit, and is removed from the adapter by being pulled off, thereby avoiding the need for tools to interchange a secondary gear having a desired configuration of teeth to engage a camera optical adjustment element such as a lens ring.

20 Claims, 8 Drawing Sheets

(56) References Cited

U.S. PATENT DOCUMENTS

| | | | | |
|---|---|---|---|---|
| 8,251,158 B2* | 8/2012 | Tomayko | ................ | B25F 5/001 |
| | | | | 173/47 |
| 8,444,904 B2* | 5/2013 | Miyauchi | ................ | F16H 55/06 |
| | | | | 264/328.1 |
| 9,562,596 B2* | 2/2017 | Kamada | ................ | F16H 35/10 |
| 10,823,233 B2* | 11/2020 | Xiong | ................ | B25J 9/0009 |
| 2003/0233900 A1* | 12/2003 | Fujikawa | ................ | F16H 55/17 |
| | | | | 74/457 |
| 2004/0165280 A1* | 8/2004 | Ichino | ................ | G02B 7/04 |
| | | | | 359/696 |
| 2006/0249613 A1* | 11/2006 | Scherzinger | ............ | B60R 22/46 |
| | | | | 242/374 |
| 2009/0174785 A1* | 7/2009 | Uchida | ................ | G02B 7/04 |
| | | | | 348/222.1 |
| 2013/0258507 A1* | 10/2013 | Uno | ................ | G02B 7/023 |
| | | | | 359/827 |
| 2013/0335589 A1* | 12/2013 | Yuge | ................ | H04N 5/225 |
| | | | | 348/222.1 |
| 2014/0157926 A1* | 6/2014 | Fujisawa | ................ | F16H 35/10 |
| | | | | 74/421 R |
| 2014/0267879 A1* | 9/2014 | Loukusa | ................ | G03B 17/18 |
| | | | | 348/345 |
| 2015/0153538 A1* | 6/2015 | Katano | ............. | H04N 1/00519 |
| | | | | 348/335 |
| 2017/0212323 A1 | 7/2017 | Subratie et al. | | |
| 2018/0238423 A1 | 8/2018 | Ye | | |
| 2019/0064474 A1* | 2/2019 | Aoki | ................ | G02B 7/023 |
| 2019/0258022 A1* | 8/2019 | Noda | ................ | G02B 7/10 |

OTHER PUBLICATIONS

International Preliminary Report on Patentability dated Feb. 1, 2022 in corresponding International Application No. PCT/US202/044120 filed Jul. 29, 2020; total pp. 6.

* cited by examiner

MOTOR GEAR SYSTEMS FOR CAMERAS

CROSS-REFERENCE TO RELATED APPLICATIONS

This patent application claims the benefit of U.S. Provisional Patent Application No. 62/880,616 filed Jul. 30, 2019, which is hereby incorporated by reference in its entirety.

FIELD

Gear systems as disclosed herein are configured for use with a camera to engage an external gear of a camera component such as a lens for providing a desired adjustment of one or more optical features, and more specifically, gear systems as disclosed herein are specially configured to facilitate an easy gear change without the use of tools or the like.

BACKGROUND

The use of motor gear systems as used in conjunction with cameras such as film or movie cameras and the like for adjusting such optical characteristics as lens iris and/or focus and/or zoom is known, and conventionally comprises a drive motor that is external from the camera. An example conventional motor gear system 100 is illustrated in FIG. 1A, and generally comprises a motor housing 102 having an electrically-powered motor (not shown) disclosed in the housing. A drive gear 104 is mounted on a shaft extending outside of the housing that is rotated by the motor. The drive gear 104 includes teeth 106 that are engaged with teeth 108 of a host gear 110 positioned adjacent to and in the same plane of alignment as the drive gear. The host gear 110 is mounted on a stationary shaft 112 that extends from the housing, wherein a bearing is interposed between the shaft 112 and the host gear 110 to facilitate rotation of the host gear when operated by the drive gear. In the example illustrated, axial placement of the host gear 112 on the shaft 112 is maintained or fixed by use of a retaining element such as a C-clip 114 or the like.

The host gear 110 has a set diameter and pitch, in this conventional motor gear system a 32 pitch, which may or may not complement the pitch of the particular camera component to be adjusted. Thus, in use, it is oftentimes necessary to attach a differently sized/pitched secondary gear to the host gear that complements a ring gear on the camera for the optical feature being adjusted. FIG. 1B illustrates a situation where the motor gear system 100 is rigged or otherwise mounted to be adjacent a ring gear 120 of a camera element 122, e.g., a lens, to adjust a desired optical feature, in this case, the iris of a lens having a 64 pitch. In such a situation, the camera lens iris having a 64 pitch cannot be adjusted by the host gear having a 32 pitch. FIG. 1A illustrates an example secondary gear 116 having a pitch that is different, in this case, a 64 pitch, then that of the 32 pitch host gear, wherein the addition of such secondary gear in such conventional motor gear system is made by attaching the secondary gear axially to the outside of the host gear through the use of three screws 118. Once attached, the motor gear system may be adjusted to place the secondary gear in contact with the same pitch camera ring gear to be adjusted.

While such conventional motor gear systems are useful for adjusting an optical property of the camera lens, e.g., zoom, focus, iris/aperture or the like, there are times where a different camera element needs to be adjusted that has either a different pitch or a different depth (where it is desired to match the depth of the camera ring gear to that of the motor gear system to prevent unwanted wear of the camera ring gear. The need to make such adjustments on the run occurs frequently. In such conventional motor gear system, this requires that the motor gear system be removed or retracted from the camera to access the screws holding the existing secondary gear, removing the screws and the existing secondary gear from the host gear, finding the correct secondary gear having the necessary pitch, attaching the new correct secondary gear by screwed attachment, and then moving the motor gear system into engagement with the camera ring gear to be adjusted. Alternatively, the entire motor gear system can be changed out with another motor gear system having the correct secondary gear already attached thereto. Either way, the process is time-consuming, requires that you have the necessary secondary gears and tools on hand and/or may require that one have more than one entire motor gear system handy which still takes time to properly set up with the camera.

It is, therefore, desired that a motor gear system be constructed in a manner that enables use with cameras, e.g., provides a desired geared engagement with a camera element gear such a lens gear or the like, that is specially engineered to enable removal and replacement of a gear element that engages a camera element gear without removal and replacement of the gear system and in a manner that avoids the use of tools. It is further desired that such motor gear system be configured in a manner that permits retrofit use with existing gear motors so that an entirely new gear motor is not needed. It is further desired that the motor gear system be developed comprising a number of different camera gears providing different gear pitches and/or gear depths that are all interchangeable in the system to permit a toolless switch out from the motor gear system to thereby enable quick and easy camera reuse in once an adjustable camera element has been changed.

SUMMARY

Gear drive systems as disclosed herein for use with cameras comprise a housing including an electric motor. A drive gear is connected with a shaft that extends from the housing, wherein the shaft is connected with the electric motor. A stationary shaft extends outwardly from the housing and is positioned a distance from the drive gear shaft. A host gear is rotatably disposed on the stationary shaft, and the host gear is engaged with the drive gear through respective gear teeth. An adapter is attached to the host gear and extends axially outwardly therefrom.

A secondary gear is releasably attached to the adapter and comprising a plurality of teeth disposed along an outside diameter. One of the adapter and secondary gear include one or more retaining elements for providing a releasable attachment with a complementary surface feature of the other of the adapter and secondary gear. In an example, the one or more retaining elements are disposed in the adapter, and the complementary surface feature is disposed in the secondary gear. In an example, the surface feature is a groove disposed circumferentially along at least part of an inside diameter of the secondary gear. In an example, the one or more retaining elements are disposed along an outside diameter of the adapter. In an example, the one or more retaining elements extend a distance outwardly from the outside diameter and are movable inwardly against a spring bias.

The gear drive system includes one or more registration elements disposed between the adapter and the secondary gear to rotationally fix the position of secondary gear relative to the adapter, e.g., when the one or more adapter retaining elements are disposed in the secondary gear surface feature. In an example, the registration element is connected with and extends from one of the adapter and the secondary gear to fit within a complementary surface feature of the other of the adapter and secondary gear.

Gear drive systems as disclosed herein may be used by attaching the secondary gear to the adapter. During the attaching step, the registration element of the adapter is engaged with a surface feature of the secondary gear while the two are moved/pushed axially together to rotationally fix the secondary gear to the adapter, and the retention elements of the adapter fit into the surface feature of the secondary gear to provide the releasable attachment therebetween. The secondary gear may be switched out for another secondary gear having different configured teeth by axially pulling the secondary gear away from the adapter, causing the retaining and registration elements to decouple with surface features of the secondary gear, and installing the desired secondary gear in the attaching same manner as described.

Gear drive systems as disclosed herein enable easy and toolless changing of the secondary gear (as called for when being used to adjust different features of a camera) with secondary gears having differently configured teeth for purposes of engaging differently configured teeth of a camera adjustment element such as a lens focus ring or the like. The secondary gear change out is one that involves no tools and only requires that the existing secondary gear be pulled away from attachment with the adapter and that the new secondary gear be pushed into attachment with the adapter. This configuration enables a user to easily meet accommodate adjusting different camera elements having different gear configurations easily and quickly while maintaining the use of a single gear drive system.

BRIEF DESCRIPTION OF THE DRAWINGS

Gear systems as disclosed herein for use with cameras will now be described by way of example with reference to the accompanying Figures, of which.

DESCRIPTION

Motor gear systems as disclosed herein are generally configured for use in adjusting an optical characteristic of a camera, such as a movie or a film camera and the like, wherein such optical characteristic comprising a gear ring for adjustment, e.g., lens characteristic such as the iris/aperture, zoom, and/or focus. In an example, the motor gear system comprises an adapter that is fixed to a host gear of an existing motor gear system and that is specially configured to accommodate snap-on attachment with one of a number of secondary gears, of different pitch and/or depth as called for by the particular use application, wherein such secondary gears are also specially configured to accommodate the snap-on attachment with the adapter. Configured in this manner, changes to the motor gear system to accommodate a change to the camera optical feature being adjusted is made quickly and without the need for tools or back up motor gear systems.

Figure 1A:
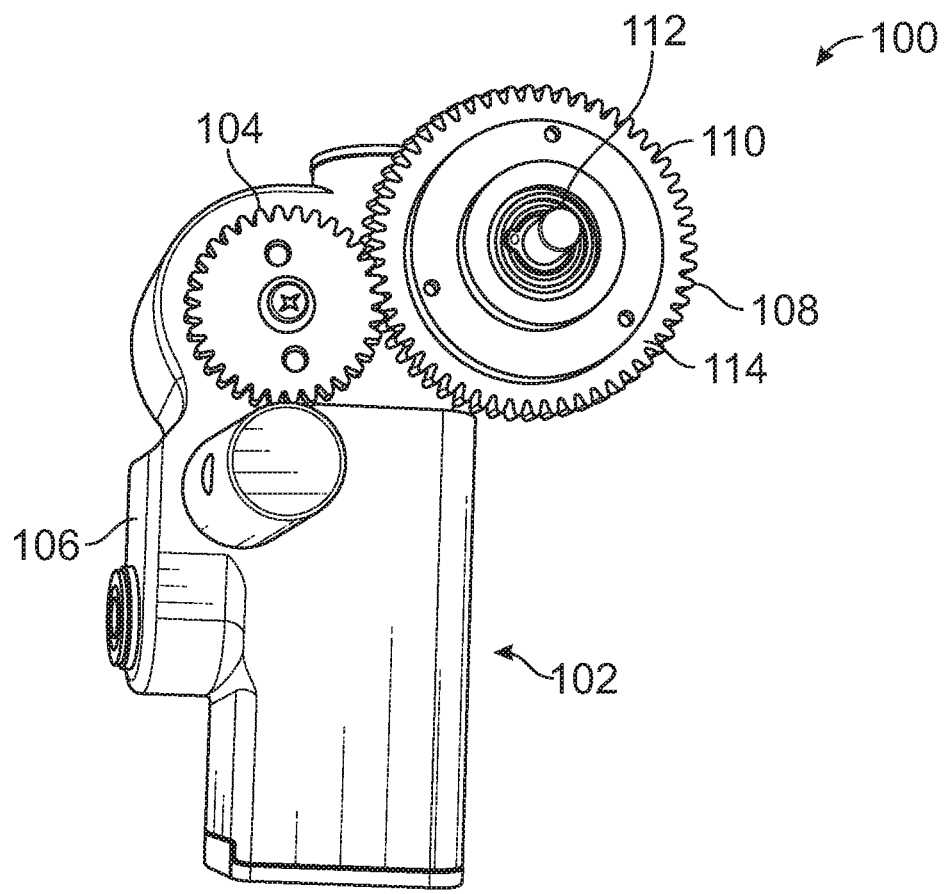
FIG. 1A is a perspective view of a conventional motor gear system.
Figure 1A:
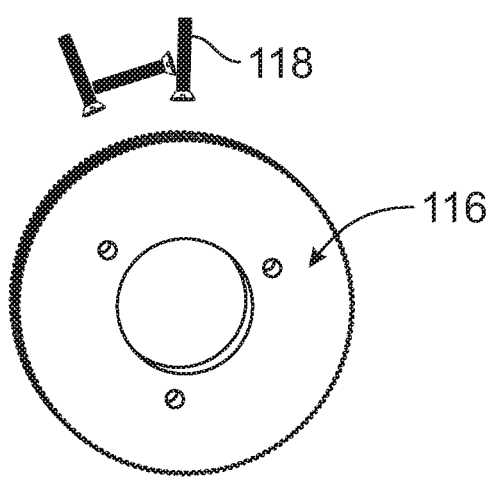
Figure 1B:
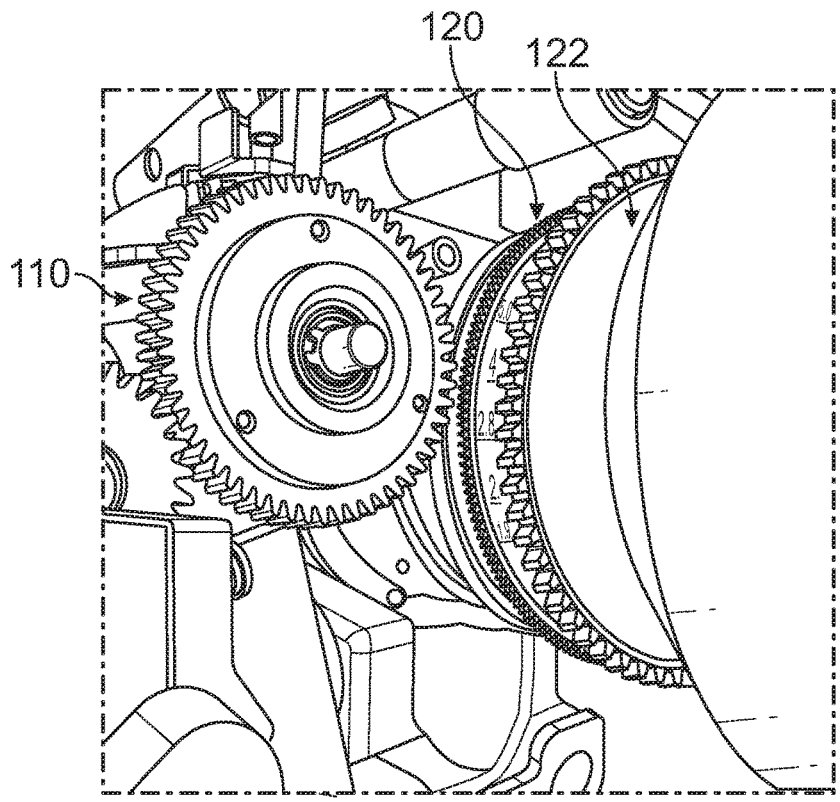
FIG. 1B is a perspective view of a conventional motor gear system as used with a camera.
Figure 2:
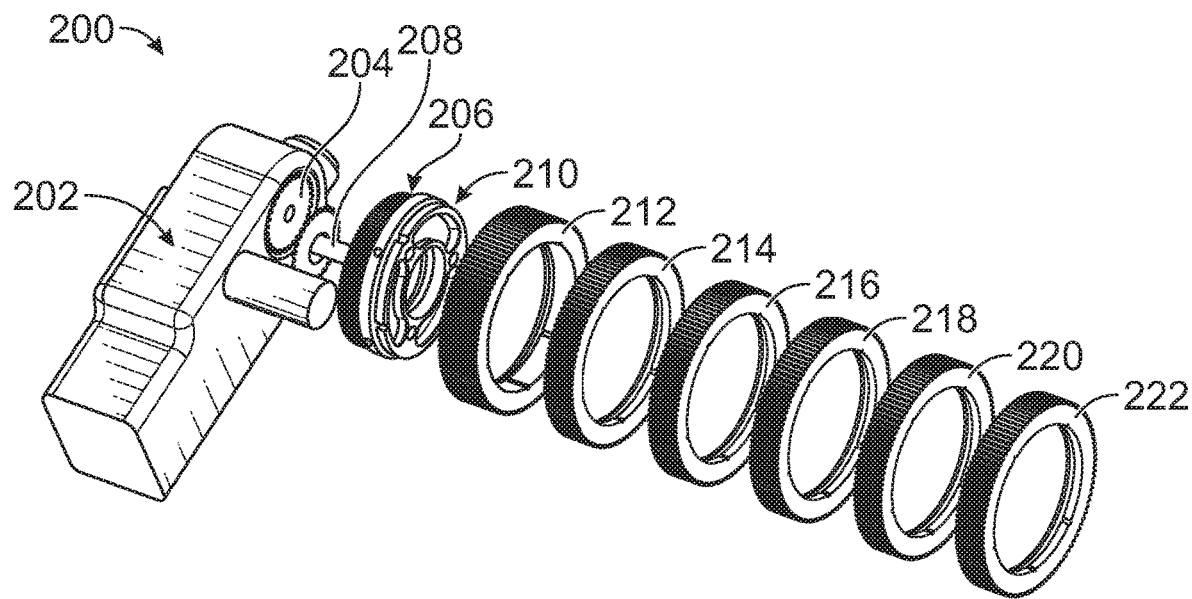
FIG. 2 is a perspective view of a gear system as disclosed herein shown in an unassembled state.

FIG. 2 illustrates an example motor gear system 200 as disclosed herein showing a housing 202 comprising an electric motor (not shown) disposed therein that operates to rotate a drive gear 204. A host gear 206 is shown in an unmounted state away from a stationary shaft 208 upon which the host gear is placed. In an example, a bearing is interposed between the host gear and the shaft to facilitate rotation of the host gear on the shaft with actuated by the drive gear. An adapter 210 is attached to an axial end of the host gear (as discussed in detail below), and is configured to accommodate a snap-on attachment of one of many different secondary gears 212, 214, 216, 218, 220 and 222 as illustrated which may have a different pitch and or have a different depth as called for by a particular end-use application, i.e., the configuration of the camera ring gear being engaged to change the desired camera optical property. In an example, each of the different secondary gears has an identification indicia along an outside surface indicating the particular pitch and/or depth for purposes of easy identification for a user.

Figure 3A:
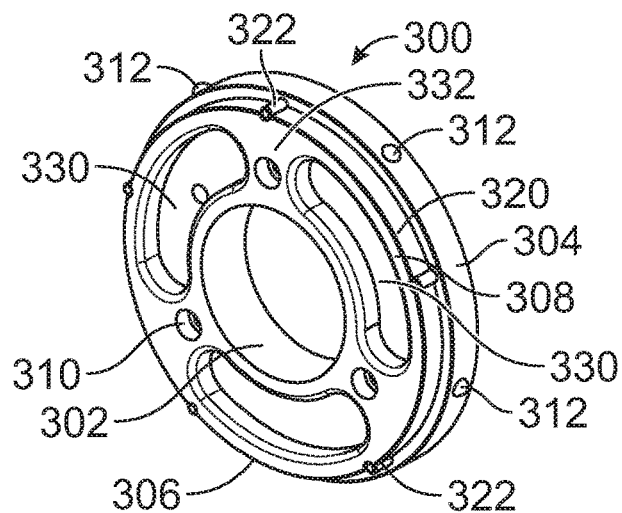
FIG. 3A is a perspective side view of an example adapter as used with gear systems as disclosed herein.

FIG. 3A illustrates an example adapter 300 as used with motor gear systems as disclosed herein in an assembled state. The adapter 300 has a circular shape with an opening 302 having an inside diameter and an edge surface 304 having an outside diameter. The adapter has a frontside surface 306 on one axial end and a backside surface 308 on an opposed axial end. In an example, the adapter backside surface 308 is generally flat for attaching against an axial end of the motor gear system host gear. The adapter opening 302 is generally sized to accommodate access to a retaining element used to attach the host gear to the stationary shaft to thereby enable removal of the combined adapter and host gear from the stationary shaft if so needed. The adapter includes mounting holes 310 extending through a thickness of the adapter and positioned to accommodate using fastening members, e.g., screws, for attaching the adapter to the host gear. In an example, the adapter comprises three mounting holes positioned in a location corresponding to mounting points on the host gear.

In an example, moving axially from the backside surface 308, the edge surface 304 extends axially a partial distance along the thickness of the adapter and comprises one or more retaining elements 312 disposed radially therein. In an example, the retaining elements 312 are configured projecting outwardly a partial distance from the edge surface 304 and capable of retracting inwardly against an outward spring bias to a position extending slightly outwardly from the edge surface 304.

Figure 3B:
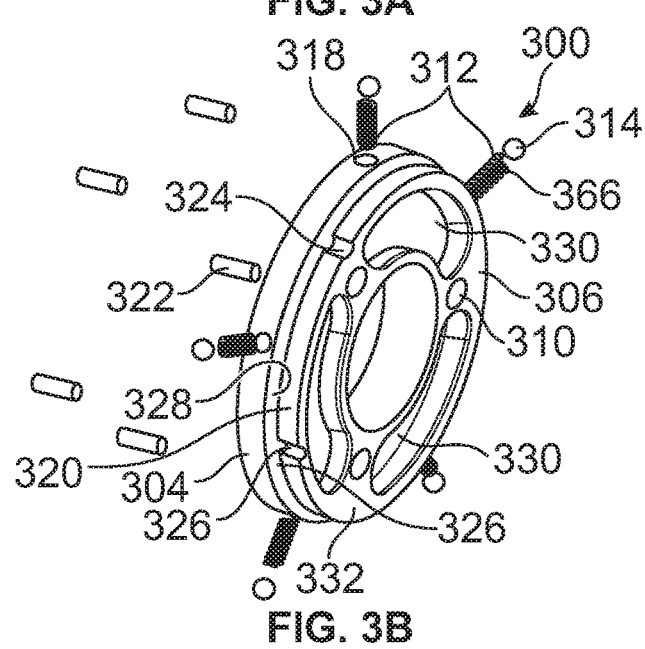
FIG. 3B is a perspective side view of the adapter of FIG. 3A shown in an unassembled state.

FIG. 3B illustrates the example adapter 300 in an unassembled state, in an example the retaining elements 312 may be provided in the form of a ball 314 and respective spring 316 that are disposed in a radially inwardly recessed cavity 318 sized to accommodate the same. In an example, the cavity is sized slightly larger than ball 314 thereby enable the ball to project outwardly a partial distance from the cavity while retaining the ball and spring within the cavity by a process called staking. In an example, the adapter may comprise one or more of such retaining elements 312 as useful for enabling a snap-on attachment and retention of a secondary gear. In an example, the adapter comprises two or more such retaining elements, and in the illustrated example comprises approximately five retaining elements that are equidistantly spaced apart along the edge surface 304 for the purpose of providing a secure snap-on attachment and retention of the secondary gear.

With reference to FIGS. 3A and 3B, the example adapter 300 includes a recessed edge section 320 extending axially from the edge surface 304 to the front side surface 306, wherein the recessed edge section has an outside diameter that is less than that of the edge surface 304. The recessed edge section 320 is configured to accommodate fitment of a secondary gear inside diameter section therein as described below. In an example, the recessed edge section 320 includes one or more registration elements 322 disposed therein for the purpose of engaging a complimentary registration feature of the secondary gear during fitment to rotational fix the secondary gear and adapter together. In an example, the one or more registration elements 322 extend axially along the recessed edge section 320.

In an example, the registration elements 322 are in the form of pins that fit radially into respective recessed grooves 324 disposed in the recessed edge section. In an example, the adapter includes holes 326 extending a partial axial depth into a shoulder section 328 of the adapter between the edge surface 304 and recessed edge section 320. Each hole 326 is sized and positioned to accommodate an end portion a pin that is disposed in a groove 324 and axially fixes the pin 322 to the adapter. In an example, the adapter comprises more than one of the registration elements or pins 322 as useful to fix the rotational placement of the secondary gear on the adapter, i.e., to prevent the secondary gear from rotating relative to the adapter once the secondary gear is attached with the adapter. In an example, the adapter comprises five pins that are equidistantly spaced apart along the recessed edge section 320.

In an example, the adapter 300 front side surface 306 comprises recessed sections 330 that extend axially inwardly a partial depth for purposes of weight reduction. In an example, the adapter includes three recessed sections 330 of approximately equal configuration and that are separated by web portions 332, wherein the mounting holes 310 for attaching the adapter 300 to the host gear are disposed through the web portions 332. It is to be understood that the recessed sections 330 are optional. In an example, the adapter may be formed from a structurally rigid material such as a metal or metal alloy that may be formed by mold or machine process. In an example, the adapter is formed from aluminum by machine process, and may or may not be anodized.

Figure 3C:
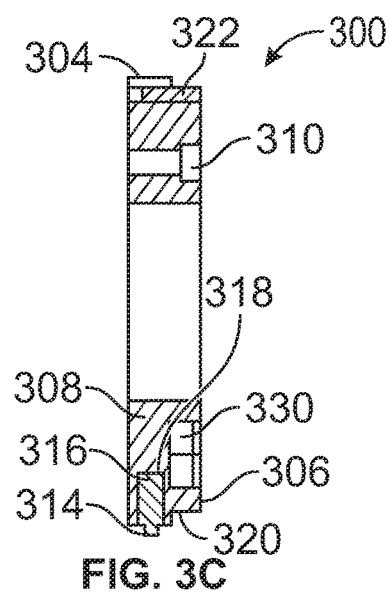
FIG. 3C is a cross-sectional side view of the adapter of FIG. 3A shown in an assembled state.

FIG. 3C illustrates the example adapter 300 in cross-section showing the mounting hole 310 extending between the frontside and backside surfaces 306 and 308, the retaining element 322 disposed in the recessed edge section 320 and extending into the hole, as well as the optional recessed section 330 in the frontside surface 306, and the retaining element ball 314 and spring 316 disposed in the radially inwardly recessed cavity 318 along the edge surface 304.

Figure 4A:
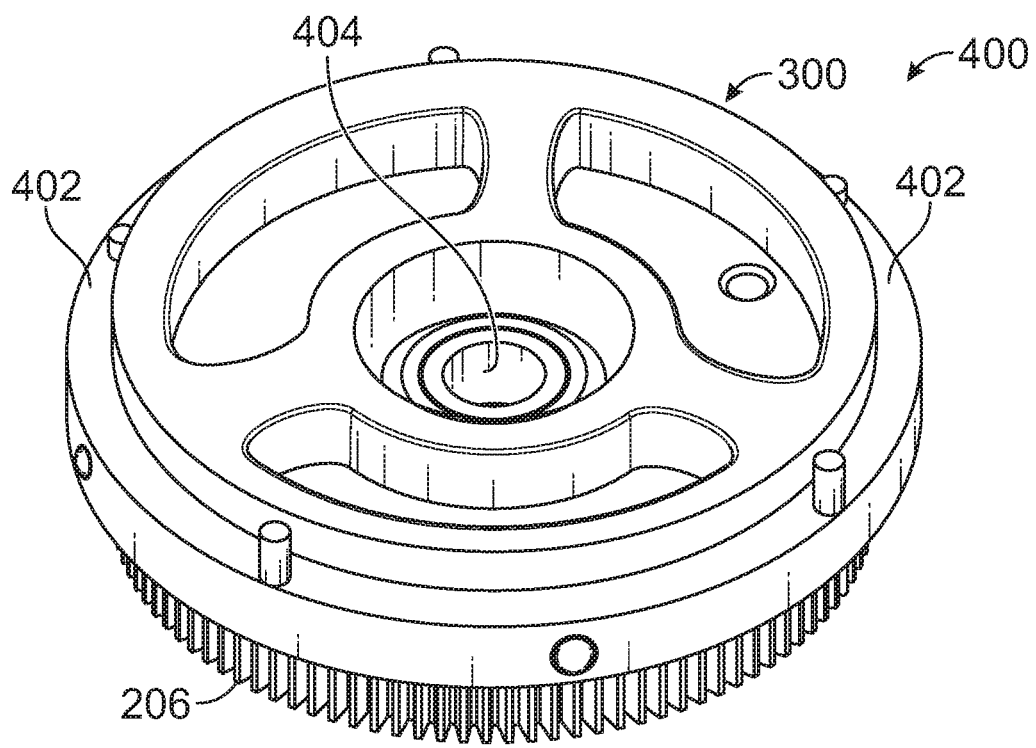
FIG. 4A is a perspective topside view of an example adapter as attached to a host gear of gear systems as disclosed herein.
Figure 4B:
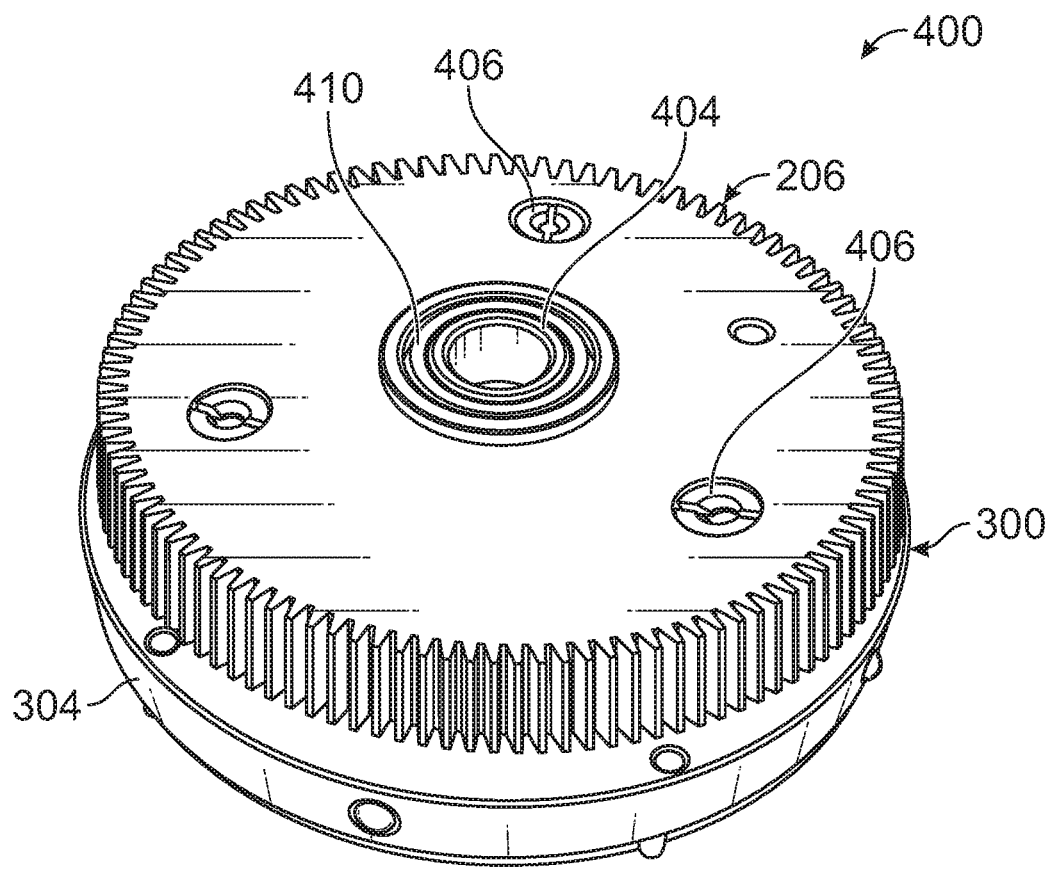
FIG. 4B is a perspective backside view of an example adapter as attached to a host gear of gear systems as disclosed herein.

FIGS. 4A and 4B illustrate an assembly 400 comprising an example adapter 300 as disclosed herein as combined with the host gear 206. FIG. 4A shows the assembly 400 with the adapter 300 on top as attached to the host gear 206 by fasteners 402 in the form of screws disposed into the mounting holes and engaged with threaded holes in the host gear. A center section 404 of the host gear can be seen through the adapter opening. FIG. 4B shows the assembly 400 with the host gear 206 on top and shows threaded inserts 406 disposed in holes accommodating the adapter fasteners therein 402. As illustrated, the adapter edge surface 304 is sized having an outside diameter that is greater than that of the host gear. Also shown is a bearing 410 that is disposed in the center section 404 of the host gear for facilitating rotation of the assembly on the stationary shaft of the motor gear system.

Figure 5A:
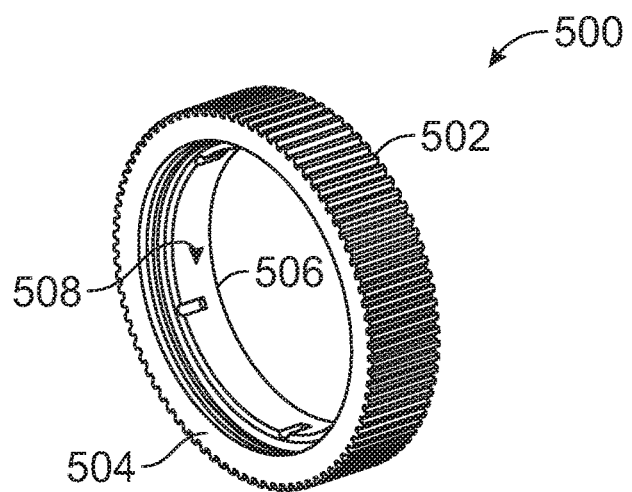
FIG. 5A is a perspective side view of an example camera gear of gear systems as disclosed herein.
Figure 5B:
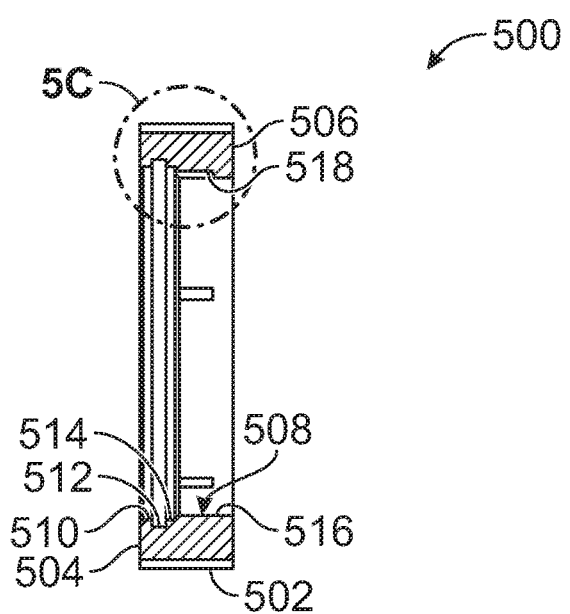
FIG. 5B is a cross-sectional side view of the camera gear of FIG. 5A.

FIGS. 5A and 5B illustrate an example secondary gear 500 as disclosed herein and as configured to facilitate snap-on attachment with the adapter. In an example, the secondary gear 500 comprises an outside diameter comprising a plurality of teeth 502 that are sized and spaced apart as called for by a particular end use application, e.g., to have a pitch that matches the pitch of a ring gear on a camera to be rotated by engagement of the secondary gear. Additionally, the secondary gear may have an axial depth as called for by the end-use application, e.g., to closely match the axial depth of the camera ring gear to be engaged and rotated. The secondary gear includes a frontside axial surface 504, an opposed backside axial surface 506, and an inside diameter 508 extending therebetween.

Figure 5C:
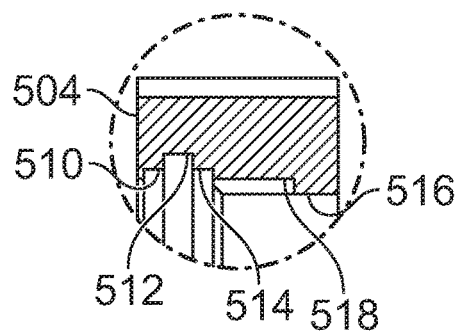
FIG. 5C is a cross-sectional side view of a section of the camera gear of FIG. 5B.

Also referring to FIGS. 5B and 5C, moving axially inwardly from the frontside surface 504, the inside diameter 508 includes a recessed section 510 that leads to a recessed groove 512 extending circumferentially around the inside diameter. The recessed section 510 and recessed groove 512 are configured to accommodate engagement of the adapter respective edge surface and retaining elements therein. Moving axially inwardly from the recessed groove 512, the inside diameter includes a shoulder section 514 that transitions from the recessed groove 512 to a reduced diameter section 516. The reduced diameter section 516 includes one or more recessed registration grooves 518 are disposed a partial depth therein and that extends axially a partial length of the reduced diameter section.

The registration grooves are configured to accommodate engagement and placement of the adapter registration elements or pins to thereby rotationally fix the secondary gear relative to the adapter. In an example, the secondary gear comprises five such registration grooves 518 corresponding to the number of adapter registration elements as disclosed above in an example adapter. In an example, secondary gears as disclosed herein may be formed from a structurally rigid material such as a metal or metal alloy that may be formed by mold or machine process. In an example, the adapter is formed from aluminum by machine process, and may or may not be anodized.

Configured in this manner, the secondary gear attaches to the adapter by axially aligning the frontside of the adapter with the frontside of the secondary gear, pressing the adapter and secondary gear together causing the adapter recessed edge section and registration elements to move into the reduce diameter section of the secondary gear and engaging respective registration grooves disposed therein, and continuing to press together to cause the adapter registration elements to be temporarily retracted and then extend by spring force into the secondary gear recessed groove, thereby providing a snap-on fit between the adapter and the secondary gear that fixes the gear rotationally to the adapter for use.

Figure 6:
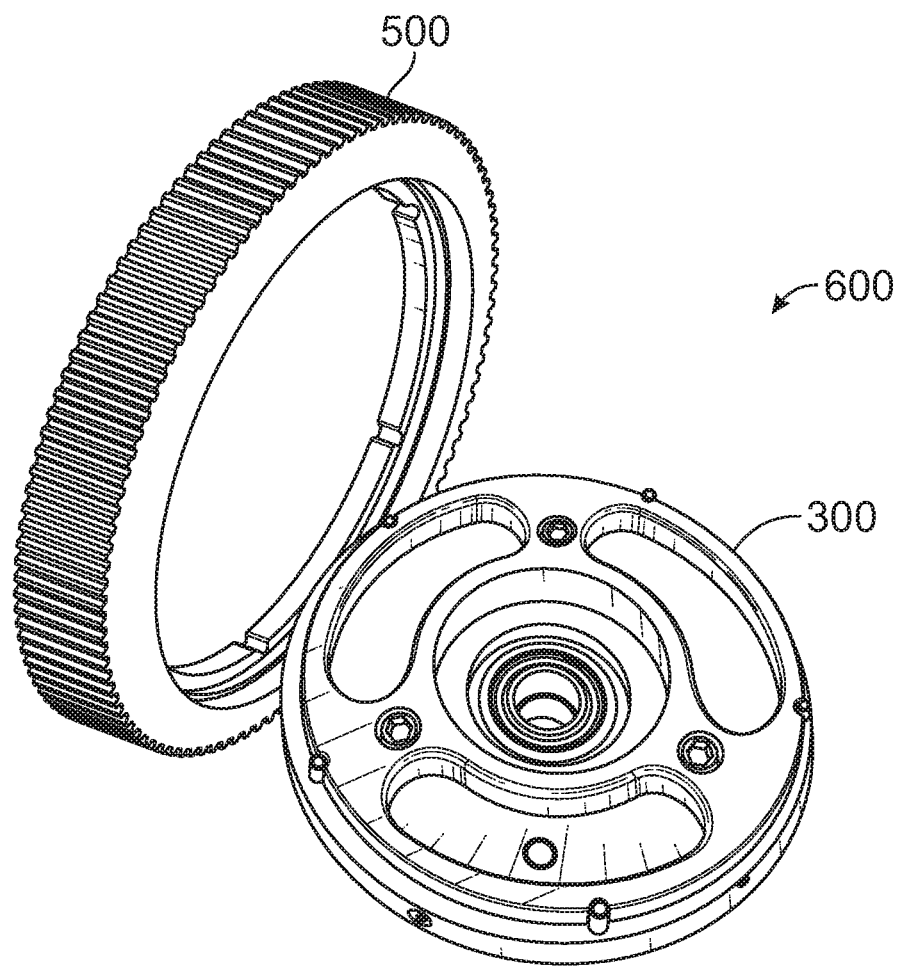
FIG. 6 is a perspective frontside view of an example adapter and camera gear of gear systems as disclosed herein in an unassembled state.
Figure 7:
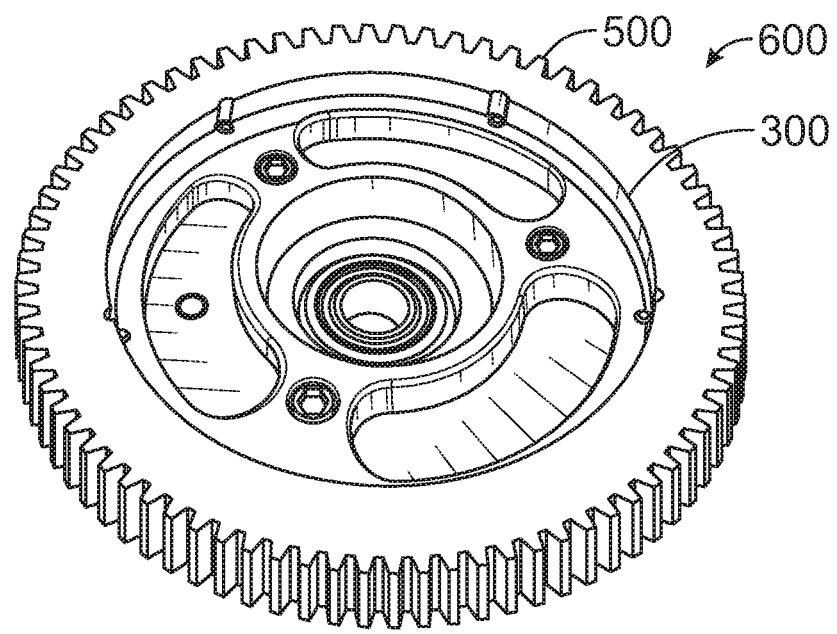
FIG. 7 is a perspective frontside view of the adapter and camera gear of FIG. 6 in an assembled state.

FIG. 6 illustrates an example adapter and secondary gear assembly 600 in an unassembled state, showing an example adapter 300 and secondary gear 500 and the various features of each as disclosed and illustrated individually above. FIG. 7 illustrates an example adapter and secondary gear assembly 600 comprising an example adapter 300 and secondary gear 500 in an assembled state, combined together the manner described above by snap on or snap fit attachment, wherein the retaining elements of the adapter are disposed in the secondary gear recessed groove to provide removable axial fitment therebetween, and wherein the adapter registration elements are disposed in the secondary gear registration grooves to rotationally fix the secondary gear and adapter together.

Figure 8:
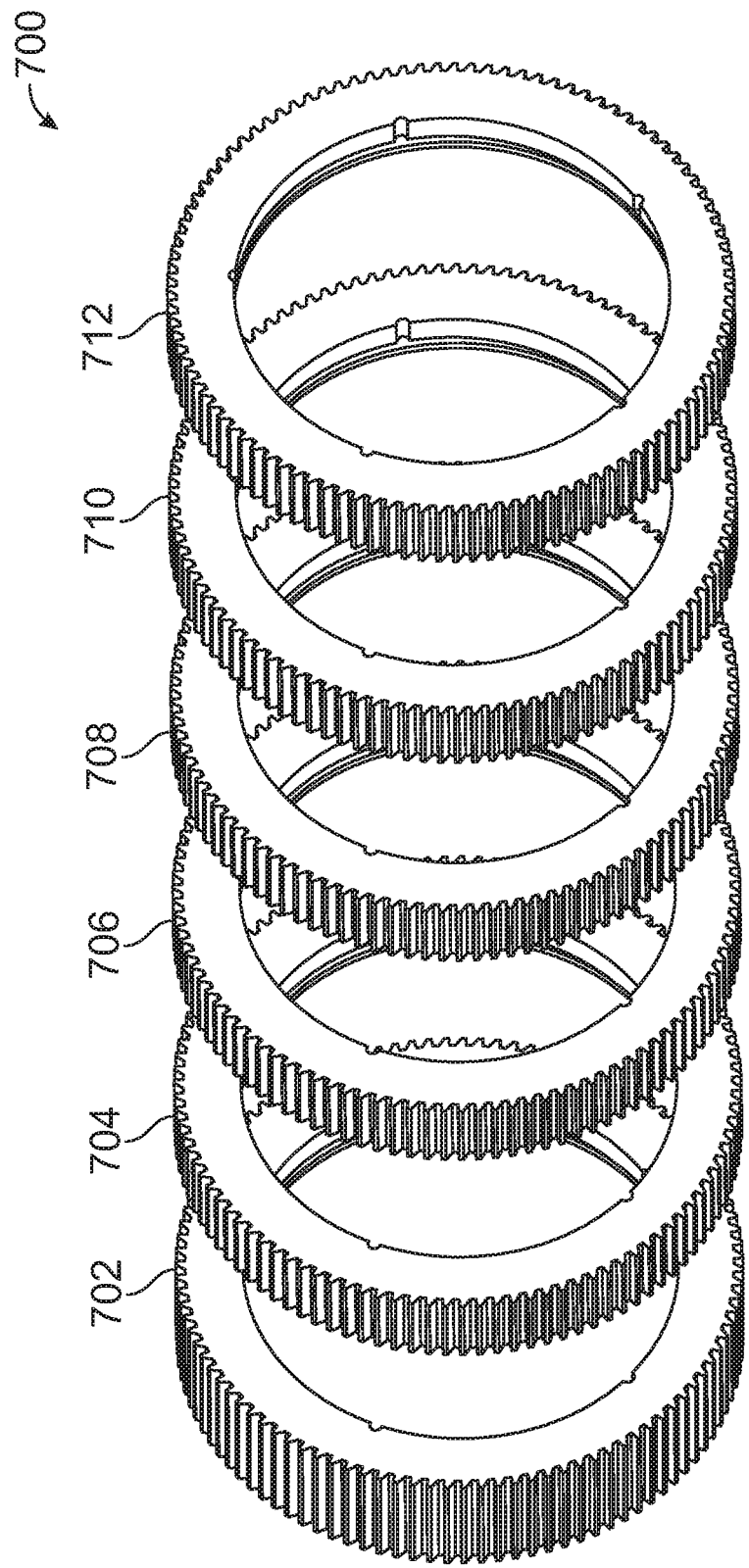
FIG. 8 is a perspective view of differently configured example camera gears of gear systems as disclosed herein.

FIG. 8 illustrates an assembly of secondary gears 700 comprising a number of secondary gears each comprising the same inside diameter configuration as disclosed above, while having an outside diameter of teeth that are configured differently and/or having an axial depth that is different to complement a number of different camera ring gear teeth and depth configurations to enable the motor gear system as disclosed herein to function to adjust a number of different camera optical characteristics. In an example, the secondary ring gears may each have a different number or pitch of teeth, as well as a different axial depth, configured to best accommodate the different configuration of camera ring gears that may be encountered during a camera use application.

In an example, the secondary gears may be configured to provide a 32 pitch, 48 pitch, 64 pitch, and M0.5, M0.6, M.08 in SI or metric system as well as having a different number of teeth that in an example may range from 76 to 154 teeth depending on the particular application. In an example, an example motor gear system as disclosed herein may include six differently configured secondary gears, wherein a first secondary gear 702 is 76 teeth and M0.8/32 pitch (wide gear), a second secondary gear 704 is 76 teeth and M0.8/32 pitch (narrow gear), a third secondary gear 706 is 102 teeth and M0.6, a fourth secondary gear 708 is 122 teeth and M0.5, a fifth secondary gear 710 is 154 teeth and M0.6/64 pitch a sixth secondary gear 712 is 116 teeth and 48 pitch.

Figure 9:
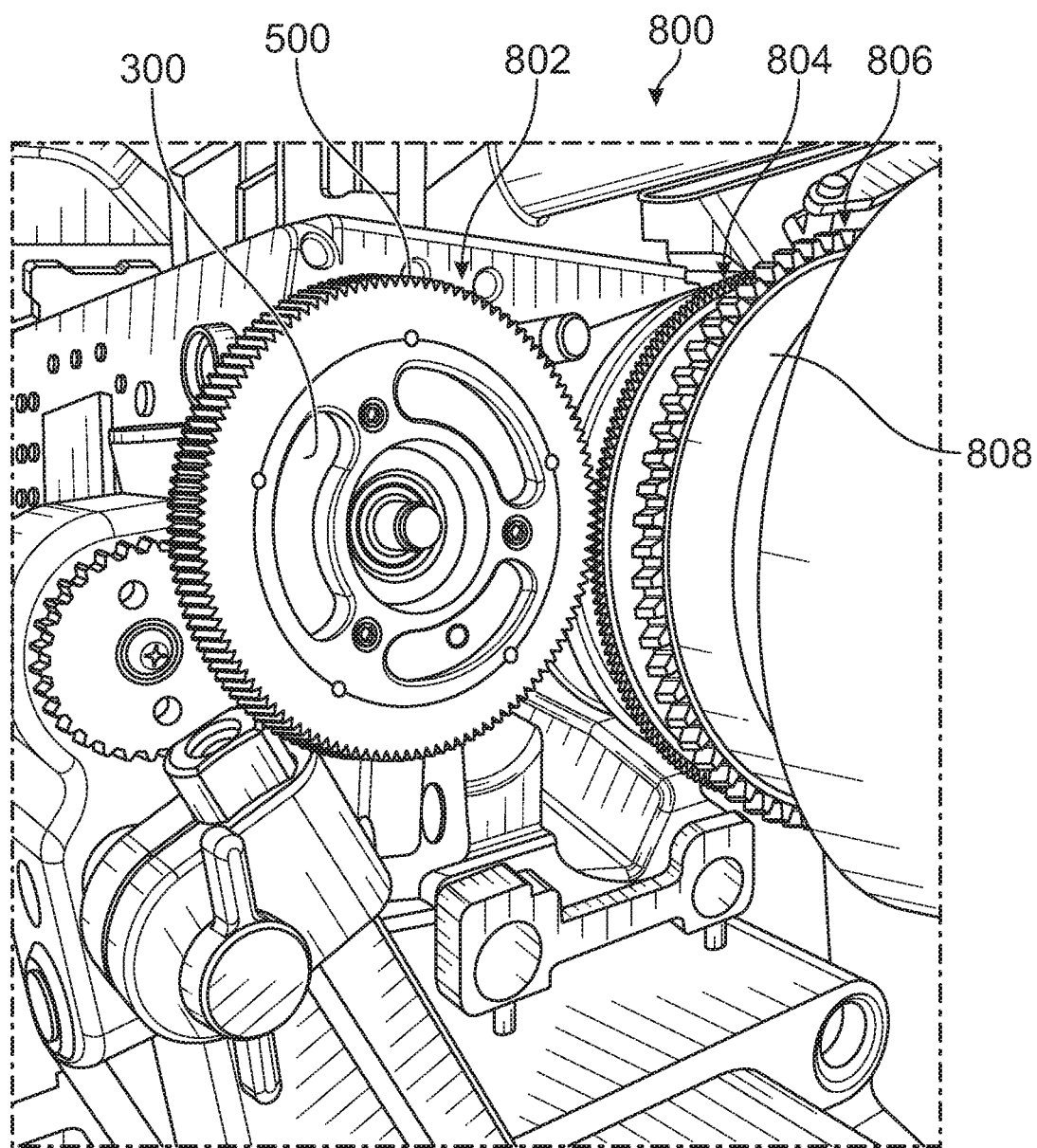
FIG. 9 is a perspective view of an example motor gear system as disclosed herein as used with a camera.

FIG. 9 illustrates an example motor gear system 800 as disclosed herein and as mounted for use to adjust an optical feature of a camera 802. The motor gear system comprising the adapter 300 and a secondary gear 500 that has been attached together as disclosed above is rigged or otherwise mounted to be adjacent a ring gear 804 of the camera lens 806 to adjust a desired optical feature, in this case, the iris of a lens having a 64 pitch. Thus, the stationary gear 500 is configured having a 64 pitch to complement the camera ring gear 502. In this example, the camera lens includes a focus ring gear 808 that has a 32 pitch configuration. If desired, the example motor gear system 800 can be adapted to adjust the focus ring gear 808 by removing the existing secondary gear 500 of 64 pitch by pulling it axially away from the adapter, and then attaching the correct secondary gear having a 32 pitch by pressing together with the adapter to provide a snap-on or snap-fit attachment.

A feature of motor gear systems as disclosed herein is the ability to replacement secondary gears as needed to adjust different camera optical properties without having to use tools by a simple press on a pull off attachment. This feature enables a user to continue using a single motor gear housing comprising the adapter attached with the host gear, and simply changing out the secondary gear that is configured as needed to adjust the camera optical feature, thus avoiding the need to have multiple motor gear systems on hand, and reducing the downtime associated with make such changes.

While certain types and constructions of example motor gear systems have been disclosed and illustrated, it is to be understood that such examples have been provided for purposes of reference and illustration, and that such motor gear systems as disclosed herein should not be limited to the particular embodiments discussed above. For example, while a particular type of mechanism has been disclosed and illustrated for providing axial retention of a secondary gear on the adapter it is to be understood that other mechanisms capable of providing a similar snap-on fitment between the two are intended to be within the scope of motor gear systems as disclosed herein. The same is true for the particular mechanism disclosed and illustrated for fixing rotational attachment of the secondary gear to the adapter, and all such other mechanisms capable of providing such fixed rotational attachment are intended to be within the scope of motor gear systems as disclosed herein. Further, while an example adapter has been disclosed as comprising both the retention elements and registration elements, it is to be understood that one or both such elements may be embodied in the secondary gear and the adapter may be configured to accommodate such different placement of these elements.

What is claimed is:

1. A gear drive system for use with a camera comprising:
   a housing comprising an electric motor;
   a drive gear connected with a shaft of the electric motor;
   a stationary shaft extending from housing;
   a host gear disposed on the stationary shaft and engaged with the drive gear;
   an adapter attached to the host gear; and
   a secondary gear attached to the adapter, wherein one of the adapter and secondary gear include one or more retaining elements for providing a releasable attachment with a complementary surface feature of the other of the adapter and secondary gear, and wherein rotational movement of the secondary gear is fixed to the adapter.

2. The gear drive system as recited in claim 1, wherein the one or more retaining elements are disposed in the adapter.

3. The gear drive system as recited in claim 2 wherein the one or more retaining elements are disposed along an outside diameter of the adapter.

4. The gear drive system as recited in claim 3 wherein the surface feature is a groove disposed circumferentially along at least part of an inside diameter of the secondary gear.

5. The gear drive as recited in claim 3 wherein the one or more retaining elements extend a distance outwardly from the outside diameter.

6. The gear drive system as recited in claim 1 wherein the secondary gear has an outside diameter comprising gear teeth disposed therearound.

7. The gear drive system as recited in claim 6 comprising a number of secondary gears, wherein each one has a different number of gear teeth.

8. The gear drive system as recited in claim 1 further comprising a registration element between the adapter and secondary gear to rotationally fix the adapter to the secondary gear.

9. The gear drive system as recited in claim 8 wherein the registration element is connected with and extends from one of the adapter and the secondary gear to fit within a complementary surface feature of the other of the adapter and secondary gear.

10. A gear drive system for use with a camera comprising:
a housing comprising an electric motor;
a drive gear connected with a shaft extending from the housing, wherein the shaft is connected with the electric motor;
a stationary shaft extending from the housing and positioned a distance from the drive gear shaft;
a host gear disposed on the stationary shaft, the host gear being engaged with the drive gear;
an adapter attached to an axial end of the host gear; and
a secondary gear positioned against an axial end of the adapter opposite the host gear, wherein the adapter comprises a number of spring biased retaining elements that are disposed within a complementary surface feature of the secondary gear to provide a releasable attachment between the adapter and secondary gear, and wherein the secondary gear is engaged with the adaptor in a manner fixing rotation of the secondary gear to the adapter.

11. The gear drive system as recited in claim 10 wherein the retaining elements are disposed along an outside diameter of the adapter.

12. The gear drive system as recited in claim 10 wherein the retaining elements are spaced apart equidistantly along the outside diameter.

13. The gear drive system as recited in claim 12 wherein the surface feature comprises a groove disposed along an inside diameter of the secondary gear.

14. The gear drive system as recited in claim 10 further comprising a registration element interposed between the adapter and the secondary gear to rotatably fix the adapter and secondary gear together.

15. The gear drive system as recited in claim 14 wherein the registration element is attached to the adapter and extends outwardly a distance therefrom and is disposed within a complementary surface feature of the secondary gear.

16. The gear drive system as recited in claim 14 wherein the registration element is disposed within a recessed section that extends axially along the inside diameter.

17. The gear drive system as recited in claim 10 wherein the secondary gear comprises number of gear teeth disposed thereon, and wherein the gear drive system comprises a number of secondary gears each having a different number of gear teeth and that each attach interchangeably with the adapter.

18. A method for attaching and removing a secondary gear as used with a camera gear drive system comprising a housing with an electric motor, a drive gear connected with the electric motor, and a host gear extending from the housing and engaged with the drive gear, the method comprising the steps of:
attaching a secondary gear to an adapter, wherein the adapter is attached and extends from the host gear, wherein one of the adapter and the secondary gear includes retaining elements that fit within respective surface features of the other of the adapter and secondary gear, wherein the step of attaching involves engaging the secondary gear with the adapter, and wherein when the secondary gear is attached to the adapter rotation of the secondary gear is fixed to the adaptor; and
removing the secondary gear from the adapter by disengaging the secondary gear from the adapter.

19. The method as recited in claim 18 wherein, during the step of attaching, engaging one or more registration elements between the adapter and secondary gear to rotationally fix the secondary gear to the adapter.

20. The method as recited in claim 18 further comprising repeating the step of attaching using a secondary gear having a different number of teeth than the secondary gear removed from the adapter.

* * * * *